Dec. 16, 1924.
O. G. LISSEN
1,519,853
GOVERNOR
Filed June 21, 1924
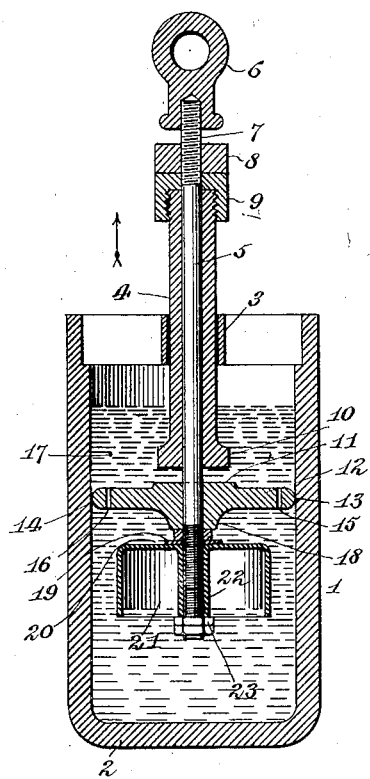
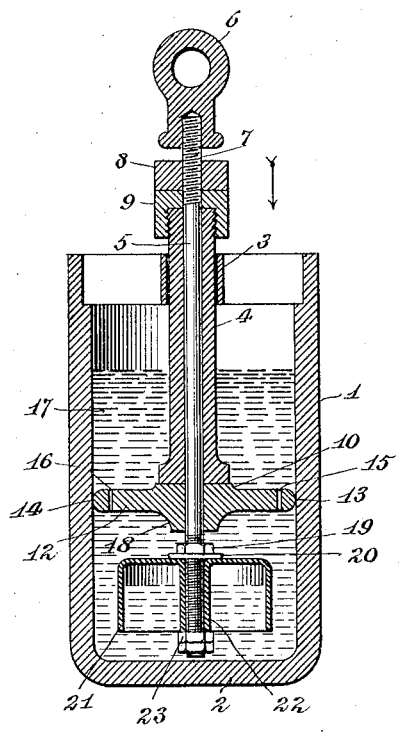
WITNESSES
INVENTOR
Olov G. Lissen.
BY
ATTORNEYS Patented Dec. 16, 1924.

1,519,853

UNITED STATES PATENT OFFICE.

OLOV GUSTAV LISSEN, OF JERSEY CITY, NEW JERSEY.

GOVERNOR.

Application filed June 21, 1924. Serial No. 721,519.

*To all whom it may concern:*

Be it known that I, OLOV G. LISSEN, a citizen of the United States, and a resident of Jersey City, in the county of Hudson and State of New Jersey, have invented a new and Improved Governor, of which the following is a full, clear, and exact description.

This invention relates to governors and particularly to a fluid governor of the dash-pot variety, the same to be used in conjunction with centrifugal governors now commonly found on steam engines or other engines for driving variable loads and subject to frequent starting and stopping.

The object of the invention is to provide a simplified fluid governor to be used in connection with centrifugal governors wherein a free movement is allowed in both directions at the extreme of the respective strokes and a slow movement permitted between these extremes, the structure being applicable to not only steam engines but electric generators and motors used in association with elevators or other devices having wide variations in load.

Another object of the invention is to provide a governor wherein a certain loose motion is provided between the piston and the driving parts, the structure being such that the loose motion is permitted at each end of the travel of the piston.

In the accompanying drawings—

Figure 1 is a longitudinal vertical sectional view through a governor disclosing an embodiment of the invention.

Figure 2 is a view similar to Figure 1 but showing the parts moving in the opposite direction.

Referring to the accompanying drawing by numerals, 1 indicates a cylinder or container having straight walls in a closed bottom 2 and an open top provided with a spider 3 or other form of guide for the hollow shaft 4, and this hollow shaft accommodates the shaft or rod 5, which rod is threaded at both ends. On the upper end of rod 5, an eye member 6 is secured, said eye member being connected to the engine in any suitable manner. The upper thread of section 7 also accommodates the nut 8, which presses against the flange nut 9, which flange nut is screwed onto the upper end of the tubular shaft 4. Preferably, the flange nut 9 is threaded interiorly so as to be screwed onto the section 7, whereby the shaft 4 and the rod 5 are locked together. At the lower end, the hollow shaft 4 is preferably formed with an enlargement or foot 10 adapted to engage the raised surface 11 of the piston 12. The piston 12 may be of metal or any desired material provided with rounded contact surfaces 13 and 14 engaging the side walls of the cylinder 1 and also with apertures 15 and 16, whereby the fluid 17 may pass from one side of the piston to the other. The lower part of the piston 12 is provided with an enlarged hub 18 adapted at one side to press against the stop 19, which stop may be threaded onto the rod 5 or merely held thereon by friction. A washer 20 is arranged beneath the stop 19 for distributing the strain therefrom to the inverted cup or bell 21 acting to confine air, whereby an air cushion is provided. The cup or bell 21 is preferably provided with a centrally positioned tubular member 22, through which rod 5 extends, so that the nuts 23 may be properly screwed onto the rod 5 and may bear against this tubular member to raise the cup 21, piston 12 and associated parts. It will be noted that by the position of the piston 12, there will be resistance in both directions to move the piston, though the greatest resistance will be to a downward movement. As the parts move downwardly, as shown in Figure 2, the oil or other liquid 7 is passed upwardly through the apertures 15 and 16 and same will pass into the cup 21 so as to compress the air therein and thereby produce a cushioning effect. After the parts have been moved down to their lowest position, as shown in Figure 2, the action is reversed and rod 5 is pulled upwardly. The first movement of the rod will be merely to raise the cup 21, which raising action is slightly assisted by the compressed air carried by the cup, and this raising action will be very free until the stop 19 has engaged the boss 18. As soon as the parts have thus engaged, the piston 12 will be moved upwardly as the rod 5 moves upwardly until it has reached its highest position, whereupon the movement of the rod will be reversed and its first downward movement will be unrestricted except for a slight restriction produced by the cup 21. This loose motion at each end of the travel of the piston 12 permits a free movement of the rod 5 and associated parts at a desirable time and thereby eliminates any forcing of the piston to quick movement at the time of the reverse of movement of the various parts. The governor embodying the invention may be associated with the usual centrifugal governors on steam engines or in connection with electric generators of any kind, the structure being such as to govern or regulate the movement of the centrifugal governor so as to allow a free and if desired, quick motion for short distances upon each reversal of movement and then a slower movement. The device also might be used as part of a door check or other purposes wherein the dash-pot principle is desirable. When used as part of a door check, the structure would permit the door to be opened a certain distance without resistance and then would permit a slower opening. The reverse then would take place, namely, a quick partial closing followed by a slower closing.

I claim:

1. A governor of the character described comprising a cylinder open at one end, a piston slidingly mounted in said cylinder, a rod loosely extending through said piston, a cup rigidly secured to said rod at its lower end, a hollow shaft surrounding said rod and connected therewith near the upper end, said shaft falling short of said piston when the piston is being supported by said cup, and means for connecting said rod to the mechanism to be governed.

2. A governor of the character described comprising a cylinder, a free piston arranged in the cylinder, and means for reciprocating said means, said means including a rod extending loosely through the piston with means forming abutments on each side of the piston, said abutments being spaced further apart than the thickness of the piston wereby there will be a loose motion produced at the end of each stroke of the piston.

3. A governor of the character described comprising a cylinder, a piston arranged in a cylinder formed with a plurality of apertures extending therethrough, a rod loosely mounted in said piston, a cup connected with said rod, said cup at one end acting as an abutment for the rod, and a hollow shaft connected with said rod acting as an abutment on the opposite side of said piston, said abutments being spaced further apart than the thickness of the piston.

4. A governor of the character described comprising a cylinder, a piston found in said cylinder, the piston having apertures therein, said cylinder being adapted to contain a liquid, a hollow shaft adapted to force said piston in one direction, a cup member acting as a cushioning structure and as a stop for forcing the piston in the opposite direction, and a rod connected with said hollow shaft to said cup for actuating the same.

5. A cylinder adapted to contain oil, a rod extending into said cylinder, a cup connected with said rod and facing toward the bottom of the cylinder, and a piston arranged in the cylinder operatively connected with the rod so that as the rod and cup move back and forth in the cylinder, said piston will be also moved.

6. In a governor of the character described, a cylinder provided with oil, a rod extending into said cylinder, a cup connected with said rod at its inner end, a hollow shaft connected with said rod at the opposite end, means carried by the cylinder for guiding the hollow shaft, and a piston mounted in said cylinder surrounding said rod, said piston having apertures therein, said piston also being formed with less thickness than the distance between the cup and the hollow shaft whereby there will be a free movement of said rod at the beginning of the movement of the rod in both directions.

OLOV GUSTAV LISSEN.